United States Patent [19] [11] 4,091,348
Kawamoto et al. [45] May 23, 1978

[54] SOLENOID DEVICE FOR ELECTROMAGNETICALLY OPERATED VALVE

[75] Inventors: Tamio Kawamoto, Sagamihara; Asao Takahashi; Hiroshi Toyota, both of Yokohama, all of Japan

[73] Assignee: Nissan Motor Company, Ltd., Japan

[21] Appl. No.: 775,531

[22] Filed: Mar. 8, 1977

[30] Foreign Application Priority Data

Mar. 12, 1976 Japan .............................. 51-29390[U]

[51] Int. Cl.² ........................................... F16K 31/02
[52] U.S. Cl. .................................. 251/129; 335/262; 335/277
[58] Field of Search ............... 335/260, 262, 251, 247, 335/248, 277, 257; 251/129, 138

[56] References Cited

U.S. PATENT DOCUMENTS

| | | | |
|---|---|---|---|
| 2,735,047 | 2/1956 | Garner et al. | 335/257 X |
| 3,396,354 | 8/1968 | Fisher | 335/262 X |
| 3,501,724 | 3/1970 | Westphal | 335/257 X |
| 3,510,814 | 5/1970 | Norfords | 335/262 |
| 3,735,302 | 5/1973 | Eckert | 335/262 |

Primary Examiner—George Harris
Attorney, Agent, or Firm—Robert E. Burns; Emmanuel J. Lobato; Bruce L. Adams

[57] ABSTRACT

A solenoid for selectively actuating a valve. The solenoid has a housing removably connected in a fluid-tight manner to a housing of the valve. An actuating coil is housed within the solenoid housing with an actuating plunger coaxial therewith internally thereof. The plunger is actuated reciprocably to a projected position for opening the valve when the actuating coil is energized and restores to a restored position when the coil is deenergized. The plunger terminates in a push pin of lesser diameter and defines a shoulder therewith and an opposite end terminates in an axial shaft or axle shaft of lesser diameter which defines a second shoulder therewith. Flexible dampeners are mounted on both shoulders for dampening the plunger movement as it reaches two extreme positions corresponding to the projected and restored positions thereof. The dampeners engage portions of the solenoid housing to dampen the plunger arrival at its terminal or extreme positions.

5 Claims, 2 Drawing Figures

SOLENOID DEVICE FOR ELECTROMAGNETICALLY OPERATED VALVE

BACKGROUND OF THE INVENTION

The present invention relates to a solenoid device for an electromagnetically operated valve.

In a solenoid device for an electromagnetically operated valve of the type having a plunger mounted for reciprocal movement along a coil, the plunger is supported by a yoke which supports the coil within a casing of the type of solenoid device. With this solenoid device there is a problem in that contacting areas on the plunger and the yoke will wear at a fast rate.

SUMMARY OF THE INVENTION

It is an object of the present invention to provide a solenoid device which eliminates the problem above.

According to the present invention, a solenoid device is provided with bearing members attached to a casing to slidably support a plunger. The plunger is slidably supported at a push pin secured to one end thereof plunger and at an axle shaft formed on the other end thereof.

BRIEF DESCRIPTION OF THE DRAWINGS

The invention will be further described hereinafter with reference to the accompanying drawings, in which.

DETAILED DESCRIPTION OF THE INVENTION

Figure 1:
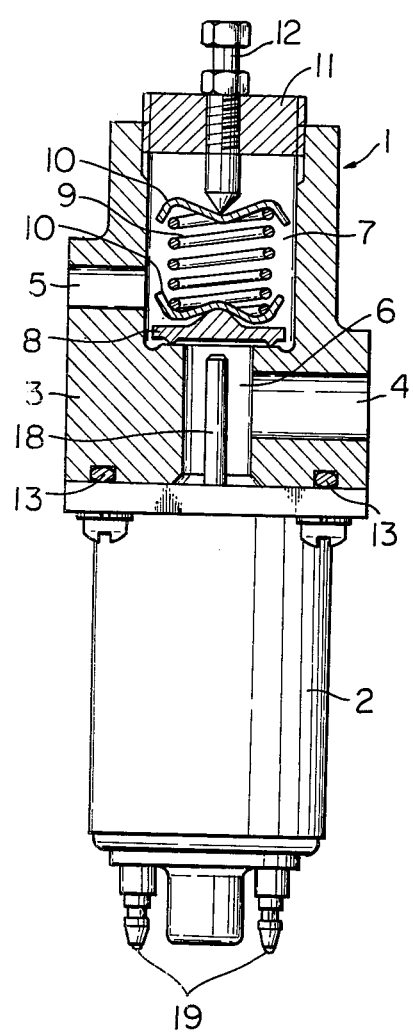
FIG. 1 is a side view of an electromagnetically operated valve incorporating a solenoid device according to the present invention, showing in section the construction of a valve section of the valve.

Referring to FIG. 1 of the accompanying drawings, there is shown an electromagnetically operated on-off valve 1 employing as its actuator a solenoid device 2 of the invention. A valve body 3 of the valve 1 is formed with an inlet port 4 and an outlet port 5. Formed within the valve body 3 are two different diametral counterbores 6 and 7. The inlet port 4 is open to a smaller diametral bore 6 and the outlet port 5 to a larger diametral bore 7 so that the inlet port 4 is connected to the outlet port 5 through the two counterbores 6 and 7. A valve member 8 is movably disposed within the larger bore 7 and is urged towards the smaller bore 6 against a shoulder between the larger and smaller bores by a compression spring within the larger bore 7, thus normally preventing flow communication between the inlet and outlet ports 4 and 5. The compression spring 9 is retained between two spring retainers 10. A force for biasing the valve member 8 can be adjusted by turning an adjusting screw 12 extending through an end plug closing the larger bore 7. An O-ring seal seals between the valve and solenoid.

Figure 2:
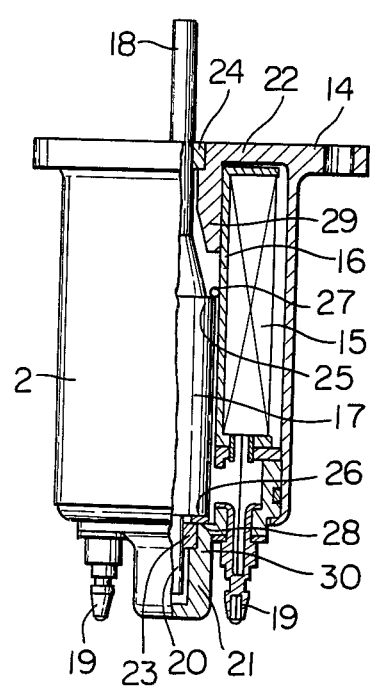
FIG. 2 is a half sectional view of the solenoid device which has been removed from the valve section of the electromagnetically operated valve shown in FIG. 1.

A plurality of screws secure the solenoid device 2 to the valve body 3. The solenoid device 2, as shown in FIG. 2, comprises a casing 14, a coil 15 disposed within the casing 14, a yoke 16 supporting the coil 15 and a plunger 17 surrounded by the yoke 16 and mounted for reciprocal movement. A push pin 18 is formed on one end of the plunger 17. Two terminals 19 are provided to connect the coil 15 electrically to a source of electricity.

The plunger 17 has formed at one end thereof an axle shaft 20. The shaft 20 and the push pin 18 of the plunger 17 are supported by bearing members 23 and 24 attached to the casing 14. Preferably, each of the bearing members takes the form of a thrust bearing using a porous bearing metal in consideration of limited space for attachment and difficulty in lubricant oil supply.

Attached to a shoulder 25 for abutment of the plunger 17 disposed on the side of the push pin 20 and to a shoulder 26 disposed on the side of the axle shaft 18 are dampening members 27 and 28, respectively, which are preferably made of a rubber, or synthetic resin or a leather or a cloth or the like.

Although not shown, another two dampening members may be attached to opposite shoulders 29 and 30 of the casing 14 to the shoulders 25 and 26, respectively.

When, in operation, the solenoid 2 is energized, the plunger 18 moves upwardly as seen towards the side of the push pin 18 until the shoulder 25 of the plunger 17 comes into abutting engagement with the opposite shoulder 29 of the casing 14. The provision of the dampening members 27 will act not only to dampen shock upon abutting engagement between the two shoulders 25 and 27 but also to prevent occurence of vibration upon such abutting engagement.

During this upward movement of the plunger 17 when the solenoid 15 is energized the push pin 18 urges the valve member 8 against the bias of the compression spring 9 to open the valve member 8, permitting flow from the inlet port 4 to the outlet port 5 through the two counterbores 6 and 7.

When the solenoid is deenergized, the compression spring 9 urges the plunger 17 downwardly as seen until the shoulder 26 comes into abutting engagement with the opposite shoulder 30 of the casing 14. Shock and vibration upon this abutting engagement are likewise prevented by the dampening member 28.

The reciprocal movement as above of the plunger 17 can be performed smoothly by means of the bearing members 23 and 24. The provision of such bearing members 23 and 24 prevent wear between the plunger 17 and the yoke 16, between the push pin 18 and the guide member 22 and between the axle shaft 20 and the guide member 21.

It will now be appreciated that according to the present invention, parts' wear of the solenoid device and noise and vibration during reciprocal movement of the plunger are prevented, prolonging the life of the solenoid device.

What is claimed is:

1. A solenoid device for an electromagnetically operated valve comprising:
    a casing;
    a coil mounted within said casing;
    a plunger extending axially through said coil and actuated axially thereby, said plunger having a push pin at one end thereof and an axle shaft at an opposite end thereof, said push pin and said axle shaft being smaller in diameter than said plunger;
    a shoulder defined at a junction section between the plunger and said push pin;
    another shoulder defined at a junction section between the plunger and said axle shaft;
    a first bearing member attached to said casing circumferentially of said push pin and slidably supporting said push pin;

a second bearing member attached to said casing circumferentially of said axle shaft and slidably supporting said axle shaft;

said plunger being reciprocally slidably mounted by said first and second bearing members for axial movement to two terminal axial positions relative to said casing;

a first dampening member attached to said shoulder at said junction section interconnecting said plunger and said push pin and disposed to abut against said casing when said plunger assumes one of two extreme axial positions thereof; and a second dampening member attached to said another shoulder at said junction section interconnecting said plunger and said axle shaft and disposed to abut against said casing when said plunger assumes the other one of said two extreme axial positions.

2. A solenoid device as claimed in claim 1, in which each of said first and second bearing members comprises a thrust bearing each made of a porous bearing metal.

3. A solenoid device for an electromagnetically operated valve comprising:

a casing;

a coil mounted within said casing coaxial therewith;

a plunger extending axially through said coil, said plunger having a push pin at one end thereof and an axle shaft at the opposite end thereof, said push pin and said axle shaft being smaller in diameter than said plunger;

a first annular thrust bearing made of a porous bearing metal and attached to said casing circumferentially of said push pin and slidably supporting said push pin; a second annular thrust bearing made of a porous bearing metal attached to said casing circumferentially of said push pin and slidably supporting said axle shaft.

4. In combination; a valve housing having an inlet and an outlet for fluid flow therethrough, a valve seat in said housing disposed providing communication between said inlet and said outlet, a valve element seated on said seat for closing the valve seat and interrupting communication between said inlet and said outlet; a solenoid for selectively unseating said valve comprising another housing attached to the valve housing in a fluid-tight manner, an actuating coil selectively energizable disposed internally of the second-mentioned housing, a plunger coaxial with said coil internally thereof mounted for axial movement to a projected position externally of said second housing into and through said valve seat for unseating said valve when said coil is energized, a spring restoring said valve to a seated position and said plunger restoring itself to a retracted position when said coil is denergized, said plunger having a push pin of lesser diameter at one end and having an axle shaft of lesser diameter at an opposite end, said push pin defining a first shoulder at a section of intersection with said plunger and said axle shaft defining a second shoulder at a section of intersection with said plunger, a first flexible damper mounted on said first shoulder for engaging said second-mentioned housing and dampening movement of said plunger as it travels to said projected position, and a second flexible dampener mounted on said second shoulder for engaging said second-mentioned housing and dampening movement of said plunger as it restores to said restored position.

5. The combination according to claim 4, in which said solenoid comprises a thrust bearing circumferentially of said push pin for slidably supporting it and another thrust bearing circumferentially of said axle shaft for slidably supporting it.

* * * * *